(12) United States Patent
Elmieh (10) Patent No.: US 9,851,868 B2
(45) Date of Patent: Dec. 26, 2017

(54) MULTI-STORY VISUAL EXPERIENCE

(71) Applicant: Google Inc., Mountain View, CA (US)

(72) Inventor: Baback Elmieh, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 206 days.

(21) Appl. No.: 14/513,761

(22) Filed: Oct. 14, 2014

(65) Prior Publication Data

US 2016/0026344 A1    Jan. 28, 2016

Related U.S. Application Data

(60) Provisional application No. 62/027,986, filed on Jul. 23, 2014.

(51) Int. Cl.

| | | |
|---|---|---|
| *G06F 3/00* | (2006.01) | |
| *G06F 3/0482* | (2013.01) | |
| *G11B 27/10* | (2006.01) | |
| *H04N 21/414* | (2011.01) | |
| *H04N 21/8541* | (2011.01) | |
| *G06F 3/0346* | (2013.01) | |
| *G06F 3/0484* | (2013.01) | |
| *H04N 21/422* | (2011.01) | |

(52) U.S. Cl.
CPC .......... *G06F 3/0482* (2013.01); *G06F 3/0346* (2013.01); *G06F 3/04842* (2013.01); *G06F 3/04847* (2013.01); *G11B 27/105* (2013.01); *H04N 21/41407* (2013.01); *H04N 21/42224* (2013.01); *H04N 21/8541* (2013.01)

(58) Field of Classification Search
CPC ... G06F 3/0482; G06F 3/0346; G11B 27/105; H04N 21/41407

USPC ................................ 715/719, 720, 776, 781
See application file for complete search history.

(56) References Cited

U.S. PATENT DOCUMENTS

| | | |
|---|---|---|
| 5,607,356 A | 3/1997 | Schwartz |
| 5,892,507 A | 4/1999 | Moorby et al. |
| 6,621,504 B1 | 9/2003 | Nadas et al. |
| 6,714,909 B1 | 3/2004 | Gibbon et al. |
| 7,467,218 B2 | 12/2008 | Gould et al. |
| 7,860,309 B1 | 12/2010 | Bodnar et al. |
| 7,904,812 B2 | 3/2011 | Atlas et al. |
| 9,086,724 B2 | 7/2015 | Sakaguchi et al. |
| 9,087,403 B2 | 7/2015 | Keating et al. |
| 9,183,560 B2 | 11/2015 | Abelow |

(Continued)

FOREIGN PATENT DOCUMENTS

| | | |
|---|---|---|
| EP | 1087618 | 3/2001 |
| EP | 2209306 | 7/2010 |
| WO | WO-2006056311 | 6/2006 |

OTHER PUBLICATIONS

"International Search Report and Written Opinion", Application No. PCT/US2014/046907, dated Nov. 6, 2014, 11 Pages.

(Continued)

*Primary Examiner* — Andrey Belousov
(74) *Attorney, Agent, or Firm* — Colby Nipper (57) ABSTRACT

Techniques and apparatuses enabling multi-story visual experiences are described. These techniques and apparatuses enable a user to view multiple storylines through their view selections. By so doing, a user may enjoy either or both of the stories without sacrificing the storytelling experience or a user's ability to determine a manner in which to engage with the stories.

20 Claims, 11 Drawing Sheets

(56) References Cited

U.S. PATENT DOCUMENTS

| | | | |
|---|---|---|---|
| 9,589,597 | B2 | 3/2017 | Austin et al. |
| 9,607,424 | B2 | 3/2017 | Ng et al. |
| 9,766,786 | B2 | 9/2017 | Elmieh et al. |
| 9,779,480 | B2 | 10/2017 | Austin et al. |
| 2003/0145331 | A1 | 7/2003 | Escobar et al. |
| 2003/0232318 | A1* | 12/2003 | Altenhofen ............ G09B 7/00 434/362 |
| 2004/0021668 | A1 | 2/2004 | Chevallier et al. |
| 2004/0218911 | A1 | 11/2004 | Grimes |
| 2005/0025465 | A1 | 2/2005 | Danieli |
| 2006/0256133 | A1 | 11/2006 | Rosenberg |
| 2007/0028270 | A1 | 2/2007 | Ostojic |
| 2007/0061862 | A1 | 3/2007 | Berger et al. |
| 2008/0005669 | A1 | 1/2008 | Eilersten et al. |
| 2008/0034321 | A1 | 2/2008 | Griffin |
| 2008/0215172 | A1 | 9/2008 | Digon |
| 2009/0113278 | A1* | 4/2009 | Denoue ................ G06F 3/017 715/201 |
| 2009/0198719 | A1 | 8/2009 | DeWitt |
| 2009/0199090 | A1 | 8/2009 | Poston et al. |
| 2009/0201313 | A1 | 8/2009 | Thorn |
| 2009/0249404 | A1 | 10/2009 | Chen |
| 2010/0115455 | A1 | 5/2010 | Kim |
| 2010/0153520 | A1 | 6/2010 | Daun et al. |
| 2010/0174421 | A1 | 7/2010 | Tsai et al. |
| 2010/0208138 | A1 | 8/2010 | Mohri et al. |
| 2010/0251101 | A1 | 9/2010 | Haussecker et al. |
| 2011/0126106 | A1 | 5/2011 | Ben Shaul et al. |
| 2011/0299832 | A1 | 12/2011 | Butcher |
| 2011/0304627 | A1 | 12/2011 | Kegel |
| 2012/0092348 | A1 | 4/2012 | McCutchen |
| 2012/0249424 | A1 | 10/2012 | Bove et al. |
| 2013/0073473 | A1 | 3/2013 | Heath |
| 2014/0002580 | A1 | 1/2014 | Bear et al. |
| 2014/0133834 | A1 | 5/2014 | Shannon |
| 2014/0282013 | A1 | 9/2014 | Amijee |
| 2015/0012827 | A1 | 1/2015 | Elmeih |
| 2015/0022557 | A1 | 1/2015 | Austin et al. |
| 2015/0023650 | A1 | 1/2015 | Austin et al. |
| 2015/0026576 | A1 | 1/2015 | Elmieh et al. |
| 2015/0378520 | A1 | 12/2015 | Chandrasekaran |
| 2016/0054863 | A1 | 2/2016 | Elmieh et al. |

OTHER PUBLICATIONS

"International Search Report and Written Opinion", Application No. PCT/US2014/047302, dated Jan. 22, 2015, 13 Pages.

"International Search Report and Written Opinion", Application No. PCT/US2014/047269, dated Nov. 10, 2014, 13 pages.

Heymann, et al., "Representation, Coding and Interactive Rendering of High-Resolution Panoramic Images and Video Using MPEG-4", Panoramic Photogrammetry Workshop, Berlin, Germany, Feb. 28, 2005, 5 Pages.

Kwiatek, "360 degree Interactive Storytelling", University of Glasgow Retrieved from the Internet: URL:http://www.kwiatek.krakow.pl/publications/28128927_360storytelling_University_of_Glasgow_Karol_Kwiatek_PDF.pdf, Sep. 27, 2012, 80 Pages.

"International Search Report and Written Opinion", Application No. PCT/US2015/041339, dated Oct. 30, 2015, 13 pages.

"SightLine: The Chair—Virtual Surreality", Retrieved from: http://sightlinevr.com/index.html on Nov. 30, 2015, 2 pages.

"Non-Final Office Action", U.S. Appl. No. 14/333,387, dated Jul. 28, 2016, 18 pages.

"Restriction Requirement", U.S. Appl. No. 14/335,821, dated Nov. 4, 2015, 5 pages.

"International Preliminary Report on Patentability", Application No. PCT/US2014/046907, dated Jan. 19, 2016, 8 pages.

"International Preliminary Report on Patentability", Application No. PCT/US2014/047302, dated Jan. 19, 2016, 8 pages.

"International Preliminary Report on Patentability", Application No. PCT/US2014/047269, dated Jan. 19, 2016, 9 pages.

"Non-Final Office Action", U.S. Appl. No. 14/335,821, dated Feb. 25, 2016, 9 pages.

"Corrected Notice of Allowance", U.S. Appl. No. 14/335,821, dated Jan. 12, 2017, 2 pages.

"Notice of Allowance", U.S. Appl. No. 14/35,821, dated Oct. 25, 2016, 5 pages.

"Pre-Interview Communication", U.S. Appl. No. 14/335,833, dated Dec. 29, 2016, 3 pages.

"Notice of Allowance", U.S. Appl. No. 14/333,387, dated May 4, 2017, 9 pages.

"Notice of Allowance", U.S. Appl. No. 14/335,833, dated May 24, 2017, 8 pages.

"Final Office Action", U.S. Appl. No. 14/333,387, dated Feb. 27, 2017, 16 pages.

"First Action Interview Office Action", U.S. Appl. No. 14/335,833, dated Mar. 6, 2017, 3 pages.

"First Action Interview Office Action", U.S. Appl. No. 14/526,311, dated Mar. 9, 2017, 3 pages.

"Foreign Office Action", EP Application No. 14752459.9, dated Mar. 6, 2017, 8 pages.

"International Preliminary Report on Patentability", Application No. PCT/US2015/041339, dated Feb. 2, 2017, 10 pages.

"Pre-Interview Communication", U.S. Appl. No. 14/526,311, dated Feb. 10, 2017, 7 pages.

"Final Office Action", U.S. Appl. No. 14/526,311, Sep. 22, 2017, 12 pages.

* cited by examiner

| Context Timing 820 | Second Story Timing 818 | First Story Event Timing 816 | First Story Events 804 |
|---|---|---|---|
| | | 0 - 0:38 | 1 |
| | | 0:39 - 1:14 | 2 |
| | | 1:15 - 1:48 | 3 |
| 8 Seconds of Context Viewed | | | |
| | | 1:48 - 2:12 | 3 |
| | | 2:13 - 6:41 | 4 |
| | | 6:42 - 6:45 | 5 |
| | | 6:56 - 10:14 | 6 |
| | | 10:15 - 11:02 | 7 |
| | | 11:03 - 11:07 | 8 |
| | 7:00 of Second Story Viewed | | |
| | | 11:03 - 12:15 | 8 |
| | | 12:16 - 13:13 | 9 |
| | | 13:14 - 16:14 | 10 |
| | | 16:15 - 17:00 | 11 |
| | 1:34 of Second Story Viewed | 17:01 - 17:40 | 12 |
| | | 17:33 - 18:14 | 12 |
| | | 18:15 - 20:00 | 13 |

806 → Total First Story Time = 20:00 + 0:04 + 0:07 = 20:11
808 → Total Second Story Time = 7:00 + 1:34 = 8:34
810 → Total Context Time = 0:08
812 → Total Experience Time = 20:00 + 0:04 + 0:07 + 8:34 + 0:08 = 28:53

MULTI-STORY VISUAL EXPERIENCE

PRIORITY APPLICATION

This application claims priority under 35 U.S.C. §119(e) to U.S. Provisional Patent Application No. 62/027,986, entitled "Multi-Story Visual Experience" and filed on Jul. 23, 2014, the disclosure of which is incorporated in its entirety by reference herein.

BACKGROUND

This background description is provided for the purpose of generally presenting the context of the disclosure. Unless otherwise indicated herein, material described in this section is neither expressly nor impliedly admitted to be prior art to the present disclosure or the appended claims.

Current storytelling comes in many forms, including novels, short stories, audio books, movies, television programs, and live theater. Some of these forms of storytelling permit some limited ability to tell multiple, related stories though a single experience, such as novels that tell the story of a protagonist and an antagonist by bouncing back and forth between them. Some movies also permit some multi-story storytelling either by presented most or all of one character's story and then another, or by bouncing back and forth between them.

These current storytelling forms for telling multiple, related stories, however, don't easily permit a user to select how or whether or not to view both of the multiple stories. A user watching a movie that bounces back and forth between two stories of two characters, for example, may not wish to view both characters, or not in the same depth and detail, or not in the particular back-and-forth format.

BRIEF DESCRIPTION OF THE DRAWINGS

Techniques and apparatuses enabling multi-story visual experiences are described with reference to the following drawings. The same numbers are used throughout the drawings to reference like features and components.

DETAILED DESCRIPTION

Overview

This document describes techniques and apparatuses enabling multi-story visual experiences. Each visual experience enables a user to view multiple storylines through their view selections. By so doing, a user may enjoy either or both of the stories without sacrificing the storytelling experience or a user's ability to determine a manner in which to engage with the stories.

A single program, for example, may have an overarching story of a boy and a girl meeting and eventually falling in love. This overarching story, however, has two storylines, one about the girl character and another about the boy character. Current movies and other media generally bounce back and forth between two storylines, while the invention enables users to select to view all of the movie from the boy's perspective and then all from the girl's perspective, or bounce back and forth, or whatever the user selects. Further, these storylines include inflection events where the multiples stories intersect. Thus, when the boy and the girl meet, their stories intersect at that meeting.

Not only can the techniques enable a new form of viewing multiple related stories, the techniques may also enable a user to enjoy the stories in detail and with context even when using a mobile device. For this boy-meets-girl movie, the techniques may present the movie as a visual experience through which a user's mobile-device display is a view into that visual experience. The user may select to watch, in sufficient visual detail, the events central to one or both storylines, and deviate from those events to view the surrounding context or even subordinate stories that add to the experience but are not required for progression of either stories' plot.

These are but a few examples of the many ways in which the techniques enable a multi-story visual experience. The following discussion turns to an operating environment, techniques that may be employed in the operating environment, and a device in which component(s) of the operating environment can be embodied. In the discussion below, reference is made to the operating environment by way of example only.

Example Environment

Figure 1:
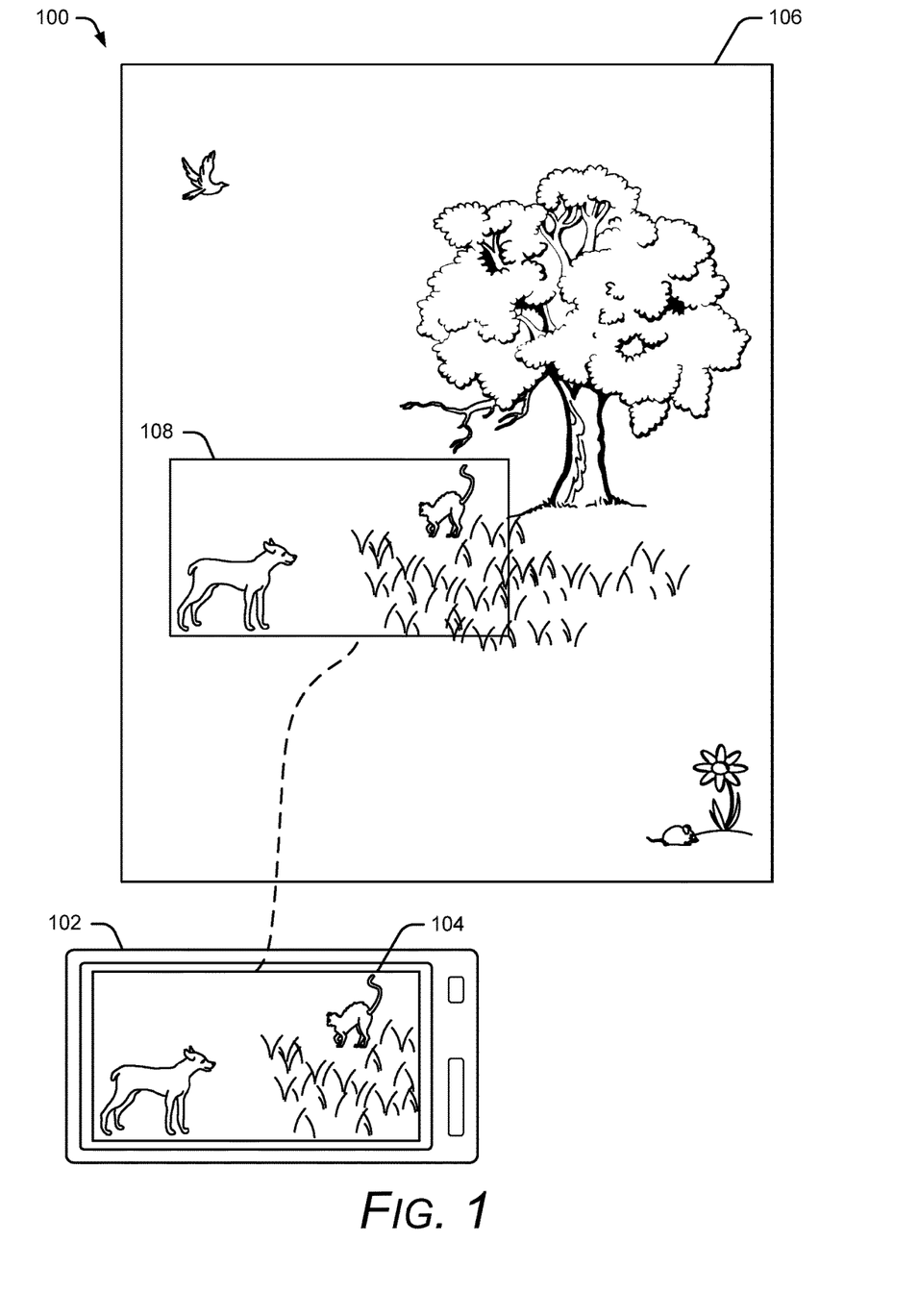
FIG. 1 illustrates an example environment in which techniques enabling multi-story visual experiences can be implemented.

FIG. 1 illustrates an example environment 100 that is operable to employ techniques described herein. Environment 100 includes a mobile media-consumption device 102 (mobile device 102) having a display 104 on which portions of visual experience 106 are presented.

Visual experience 106 is capable of telling multiple related stories and providing context for those stories, though some context within visual experience 106 can be unrelated to the stories. Each story is an authored series of events previously written by a storyteller (e.g., a human writer) and presentable in a moving visual form, such as a live-action motion picture version of Shakespeare's *Romeo and Juliet* having Romeo's and Juliet's related stories, the computer-animated movie *Toy Story* by John Lasseter, Pete Docter, Andrew Stanton, and Joe Ranft altered to tell the overarching story from two perspectives—that of Buzz and that of Woody, and the motion picture *Rocky IV* by Sylvester Stallone having two stories, that of Rocky (protagonist) and that of Ivan Drago (antagonist).

Which portions of visual experience 106 are presented on display 104 depend on view selections made by a user of mobile device 102. Thus, mobile device 102 is capable of receiving view selections and, in response to these view selections, presenting views of visual experience 106 on display 104. By way of example, presenting views can be performed through a rendering engine and a graphics card. View 108 is one example view showing a portion of visual experience 106, here a dog staring at a cat and the cat arching her back, which is central to the multiple, related stories being told.

Because view 108 shows characters central to the stories, the techniques progress through the authored series of events making up at least one of the stories. Assume, for this example, that the multiple related stories are concerned with two characters—one is the dog and one is the cat.

Also, when the view selected is contextual and thus not about the dog or the cat, mobile device 102 ceases to tell either the dog's story or the cat's story. When a user selects to view various contextual elements, such as a bird, a flower, or a mouse, the stories cease to progress. When the user again selects to view the dog, the cat, or the dog and cat, the techniques continue the story or stories. By so doing, each story can be told in sufficient detail while still permitting a user to view other stories or context for the stories.

Figure 2:
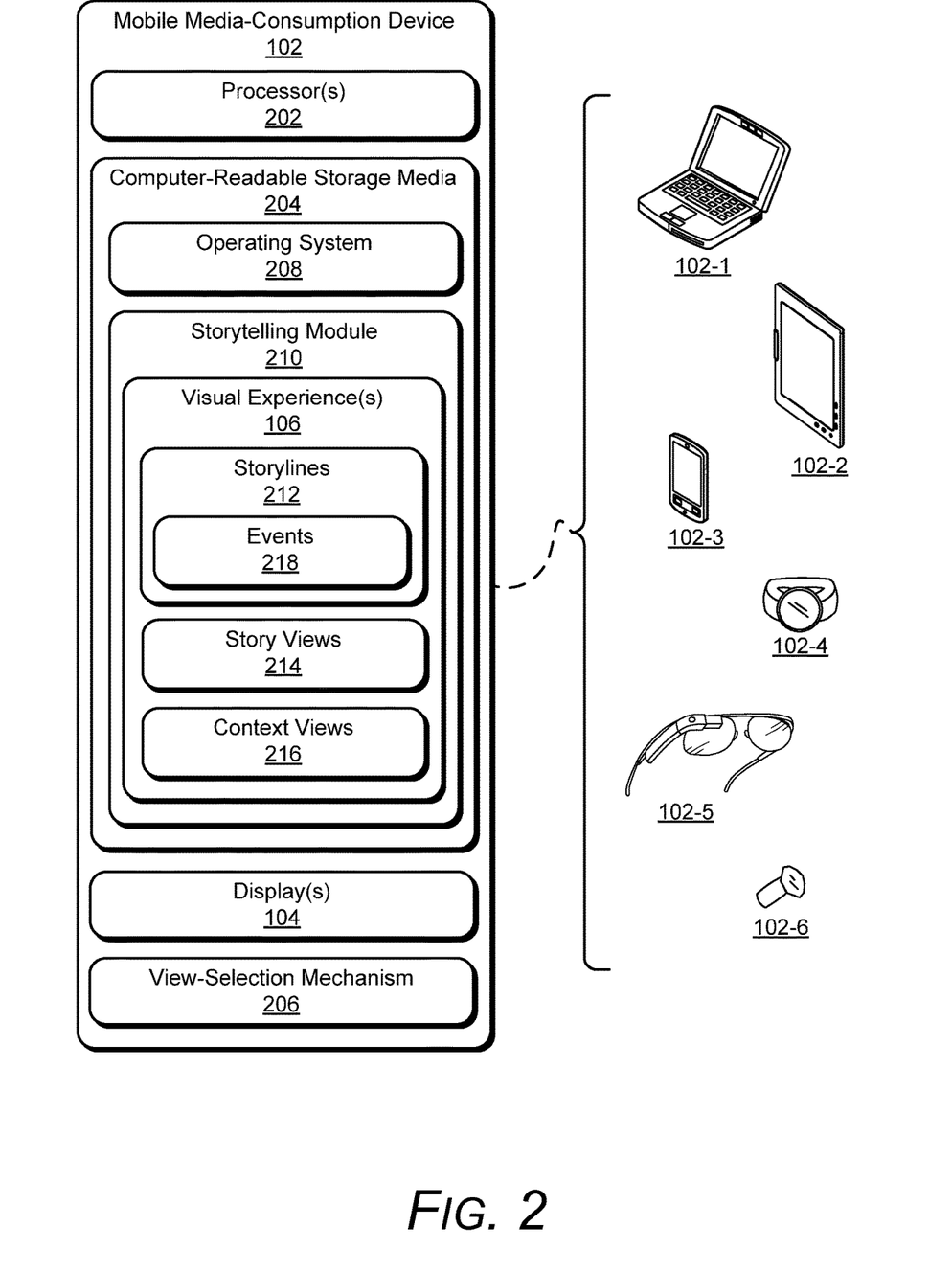
FIG. 2 illustrates an example embodiment of the mobile media-consumption device of FIG. 1.

More specifically, consider FIG. 2, which illustrates an example embodiment of mobile media-consumption device 102 of FIG. 1. Mobile device 102 is illustrated with six example devices: a laptop computer 102-1, a tablet computer 102-2, a smart phone 102-3, a media-consumption watch 102-4, media-consumption eyewear 102-5, and a media-consumption ring 102-6, though other media-consumption devices and systems, such as a personal media player, a digital camera, and a personal navigation device are contemplated.

Mobile device 102 includes or has access to computer processor(s) 202, computer-readable storage media 204 (media 204), one or more displays 104, and view-selection mechanism 206. Media 204 includes an operating system 208 and storytelling module 210. Although not shown, media 204 may also include applications and user data, such as digital images, audio files, or documents.

View-selection mechanism 206 is capable of sensing a user's view selections through various input manners and devices, which range from buttons, capacitive sensors, and touch screens to orientation sensors and cameras capable of determining an orientation or orientation change of mobile device 102. Buttons and capacitive sensors enable a user to select views through, for example, four buttons or sensors, one each to select to move the view right, left, up, or down. Touch screens or pads enable a user to select views with visual controls similar to the buttons but also through zooming gestures, such as a pinch gesture to zoom out or a spread gesture to zoom in. Cameras and orientation sensors can determine selections that tilt, turn, move in, move out, move up, move left, move right, and move down display 104, to name just a few. Orientations sensors, in some cases, include micromachined accelerometers. These micromachined accelerometers, depending on the types, are configured to measure in multiple axes magnitude and direction of proper acceleration (e.g., G-force) as a vector quantity. By so doing, the micromachined accelerometers can sense orientation, coordinate acceleration, vibration, shock, and falling. For use as orientation sensors, these micromachined accelerometers can sense six degrees of freedom of mobile device 102, including three degrees of freedom in translation (X, Y, and Z) and three in rotation (pitch, yaw, and roll). Cameras can be used to track a device's location, such as relative to a user viewing the display, by tracking imaged objects (e.g., a book pictured by the camera can be used to determine, based on the book changing size or location in an image captured by the camera, an orientation or location in three dimensions of the display) or objects that relate to the viewer, such as by tracking a user's facial features (e.g., eyes, cornea, irises).

Furthermore, view selections received through these various input manners can be mapped to a particular desired view. For example, if a user moves a display away from herself, this movement can be sensed by an accelerometer or camera of view-selection mechanism 206, and sensor data from the accelerometer or camera passed directly to storytelling module 210 or processed by view-selection mechanism 206 to analyze the sensor data to determine that the display is being moved away from the user. This determination can map to desired views, such as a zooming in or out of the currently viewed content. Other examples include selecting a right button or touch control, which is then sensed by (or passed as selection data to) view-selection mechanism 206, which in turn determines that display 104 has moved right relative to content being displayed. This determination can be passed to storytelling module 210, which then presents a different view (to the right of the prior view) of visual experience 106.

Note that these various input manners can be received and responded to in real time—a user's selection to zoom in by pulling a display in, look up by moving a display up or tilting up, or look down by tilting down, can result in the view changing as fast or nearly as fast as the user makes the selection. The techniques enable a user to view a story, movie, or other content as fast or almost as fast as the user would view his or her own world. Furthermore, these various inputs can be combined. Assume for example that a user is viewing both a man and woman sitting at an outdoor café. Assume that the user wants to see the brand of soft drink being consumed by the woman. The user may simply move the display from being centered between the couple to at the soft drink, and then at the same time or after, move the display toward the user. By so doing, view-selection mechanism 206 senses the orientation change, passes the determined orientation to storytelling module 210, which then zooms in and centers on the soft drink, thereby showing it in detail.

This mapping of view selections to portions of visual experience 106 can be conceptualized as a direct mapping from a view selection to a two or three dimensional space representing visual experience 106. Thus, for a two-dimensional movie, view selections can be mapped to point, square, or rectangle on a planar surface as a representation of the two-dimensional movie. For a three-dimensional space, such as some computer-generated shorts, television shows, or movies, or some live-action movies that are filmed with additional cameras, a view selection can be mapped to a non-planar surface representing possible views of visual experience 106. This can be conceptualized as a sphere, for example, with each new frame of the experience mapped to an interior of the sphere with a user viewing from within the interior. Thus, a view selection tilting a display down can view grass on the ground, a view selection tilting a display up can view clouds in the sky, and a view selection moving left or right can view content to the left or right.

Storytelling module 210 includes or has access to one or more visual experiences 106, which each include one of storylines 212, story views 214 (for each storyline 212), and context views 216. Storytelling module 210 is capable of presenting visual experience 106, receiving view selections, and progressing or ceasing to progress through stories based on whether or not the view selections show the story, in whole or part.

Each of storylines 212 includes an authored series of events 218 (events 218) that, when presented in the authored series, tell a story. Events 218 can be authored by one or many human authors, alone or with computer assistance. Further, events 218 can be of a fixed order and/or number, though each may vary in an amount of time to present each event. An animated short, for example, may present new scenes and actions in less than one second. A three-hour drama, however, may have few scene changes and long stretches of dialog, which can therefore include events that may be many minutes long. Events for each storyline 212 can be part of respective sets of events making up scenes or acts, which an author may arrange such that the techniques, when returning to an incomplete event, repeat sets of events, though this is not required.

Figure 3:
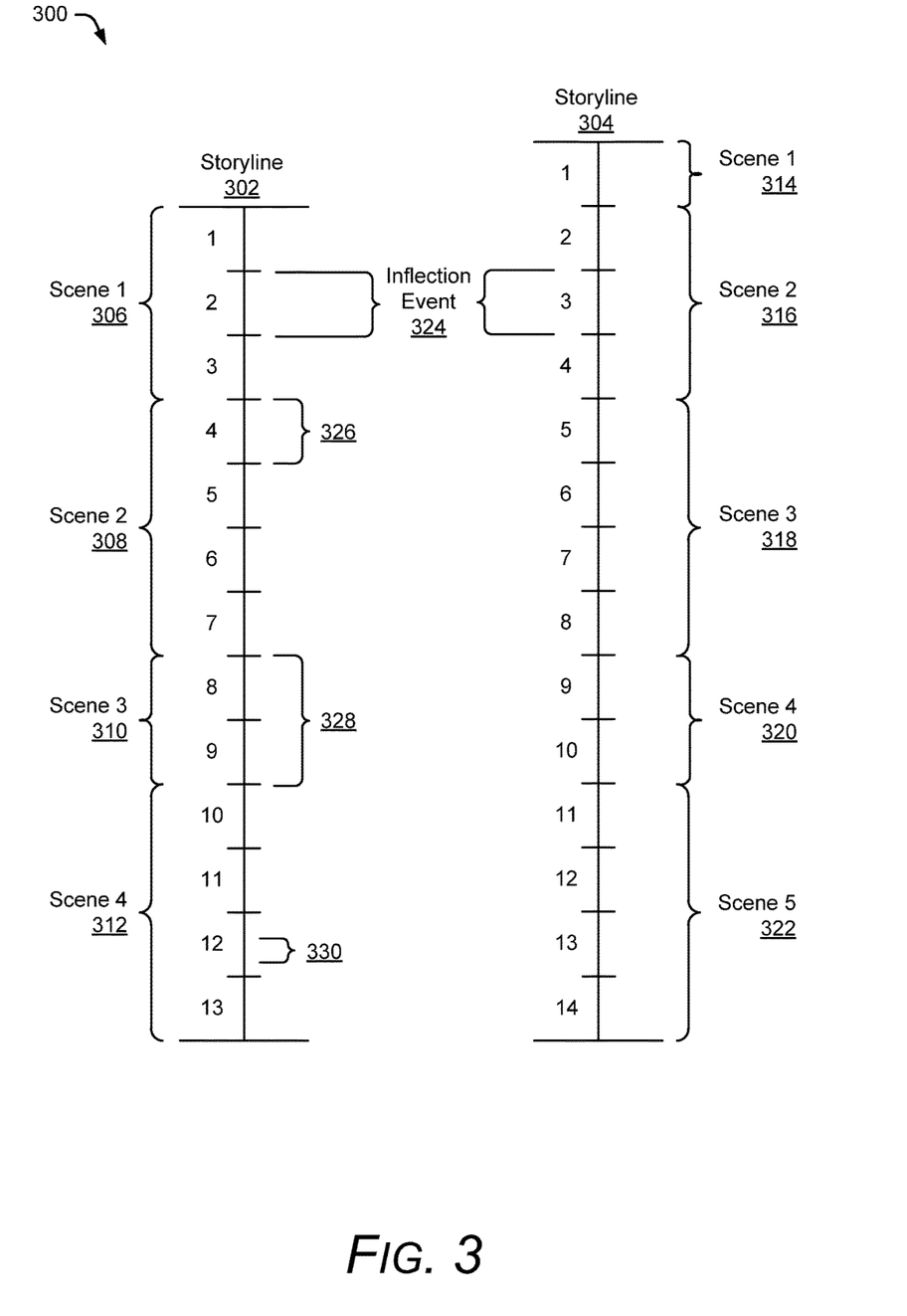
FIG. 3 illustrates storylines for an animated visual experience in which a dog chases a cat around a park.

By way of example, consider FIG. 3, which illustrates two storylines 302 and 304 for an animated visual experience having an overarching story involving a dog that chases a cat around a park, with two related stories, that of the dog (storyline 302) and that of the cat (storyline 304). The dog's story is shown graphically with storyline 302, and includes four scenes and 13 total events, first scene 306 includes events 1-3, second scene 308 includes events 4-7, third scene 310 includes events 8 and 9, and fourth scene 312 includes events 10-13. The cat's story is shown graphically with storyline 304, and includes five scenes and 14 total events, first scene 314 having event 1, second scene 316 having events 2-4, third scene 318 having events 5-8, fourth scene 320 having events 9-10, and fifth scene 322 having events 11-14. Note also that the stories may be of different lengths (in time to present or number of events), start and end at different points, and so forth. This is shown in part in FIG. 3 where storyline 304 has 14 events compared to 13 events of storyline 302 and begins before storyline 302.

Assume that the dog's event 1 includes the dog sleeping restfully in the field. FIG. 1 illustrates the next event, event 2, in which the dog wakes up and stares at the cat and during which the cat arches her back and stares back at the dog. In event 3 the dog chases the cat and the cat runs up a tree.

Assume also that the cat's storyline 304, at event 1, involves the cat briefly chasing the mouse as the mouse ducks down a small hole, the cat's event 2 involves the cat slowly creeping through the grass near the dog, event 3 shows the cat arching her back when she sees the dog stare at her, and event 4 shows the cat, in response to the dog starting to chase her, running up a tree.

Responsive to the user viewing dog's event 1, the techniques proceed to a next event of storyline 302, thereby progressing through the dog's story. The same is true of the cat's events 1 and 2, namely chasing the mouse and slowly creeping through the grass, which the user can select to view and the techniques proceed through the cat's story.

As noted in part above, some events of the multiple related stories are inflection events connecting the plots of the stories. Generally, an inflection event can be visually identical in two or more of the multiple related stories or be visually dissimilar but similar in content. The dog's event 2 and the cat's event 3, for example, are an inflection event where the two storylines 302 and 304 intersect. At the dog's event 2, the dog stares at the cat, at the cat's event 3, the cat arches her back when she sees the dog staring. This is illustrated in FIG. 3 at inflection event 324 and in FIG. 1 with view 108 showing both the dog staring and the cat arching. In view 108 the image shown is visually identical (or can be if the user views enough of visual experience 106), though the views could also be dissimilar but have a same content—such if the cat's story is shown from the cat's eyes and the dog's from the dog's eyes—they would see different things (the cat would see the dog staring, the dog would see the cat arching her back), but the content from a plot perspective is the same. Note that the dog's event 1 (dog sleeping in field) can be considered a non-inflection event as the cat, which may or may not be able to be seen regardless of view selected, is not interacting with the dog.

Inflection events can be used by the techniques in various manners, such as to require prior events of one or more of the storylines to be viewed before proceeding past an inflection event, allowing users to switch between stories only at or near inflection points, or returning to an inflection point should a storyline be paused.

Views: Story Views, Inflection Views, and Context Views

Returning to FIG. 2, story views 214 (for one of the stories) present at least a portion of one of events 218, which can be previously determined to enable a key element of the event to be seen or a substantial portion of the event to be seen. This previous determination is not required, as storytelling module 210, in some cases, can determine which views present events 218 of storyline 212. Whether predetermined or not, various manners can be used to determine what a view shows, whether one story, another story, a subordinate story, or a context view.

Figure 4:
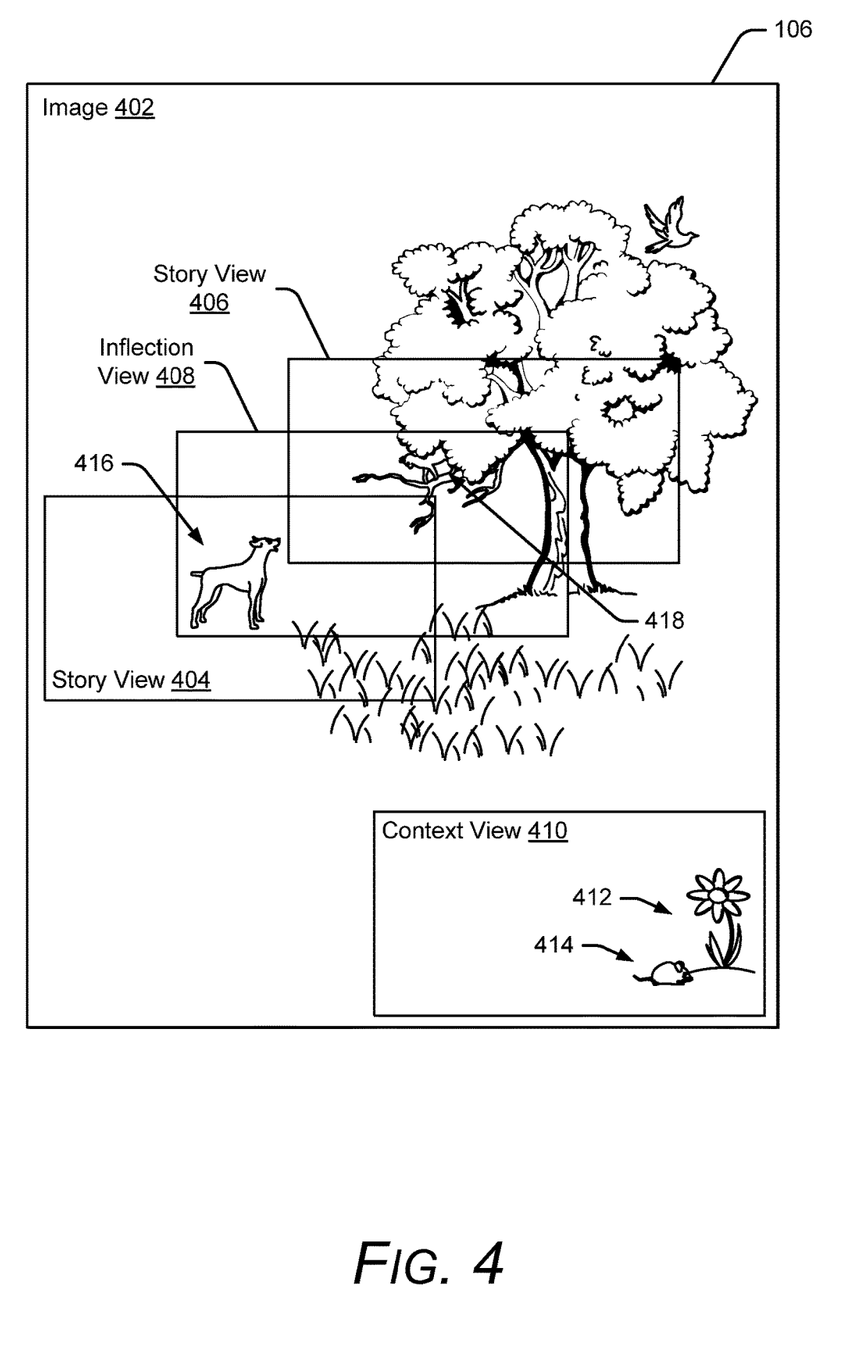
FIG. 4 illustrates an image of a visual experience for storylines shown in FIG. 3.

By way of example, consider FIG. 4, which illustrates an image 402 of visual experience 106 for storylines 302 and 304 of FIG. 3. Image 402 includes story view 404 showing dog's event 4 of storyline 302, story view 406 showing cat's event 5 of storyline 304, inflection view 408 showing portions of both dog's event 4 and cat's event 5, and a context view 410.

Dog's event 4 includes the dog barking at the cat with the cat up the tree. Cat's event 5 shows the cat up the tree and looking down at the dog. Inflection view 408 shows portions of both events sufficient to tell both stories. Context view 410 includes no portion or an insufficient portion of either event. Context view 410 show flower 412 and mouse 414 but does not show any of dog 416 or cat 418, and thus is not showing something central to either storyline.

Here assume that the author assigned conditions for determining whether a view is a story view, inflection view, or context view such that story views are those that show the cat or the dog but not both. An inflection view, however, is assigned as one showing both storylines at once, such as to include at least the dog's eyes and the cat's eyes but do not require both of their bodies to be within the view.

Figure 5:
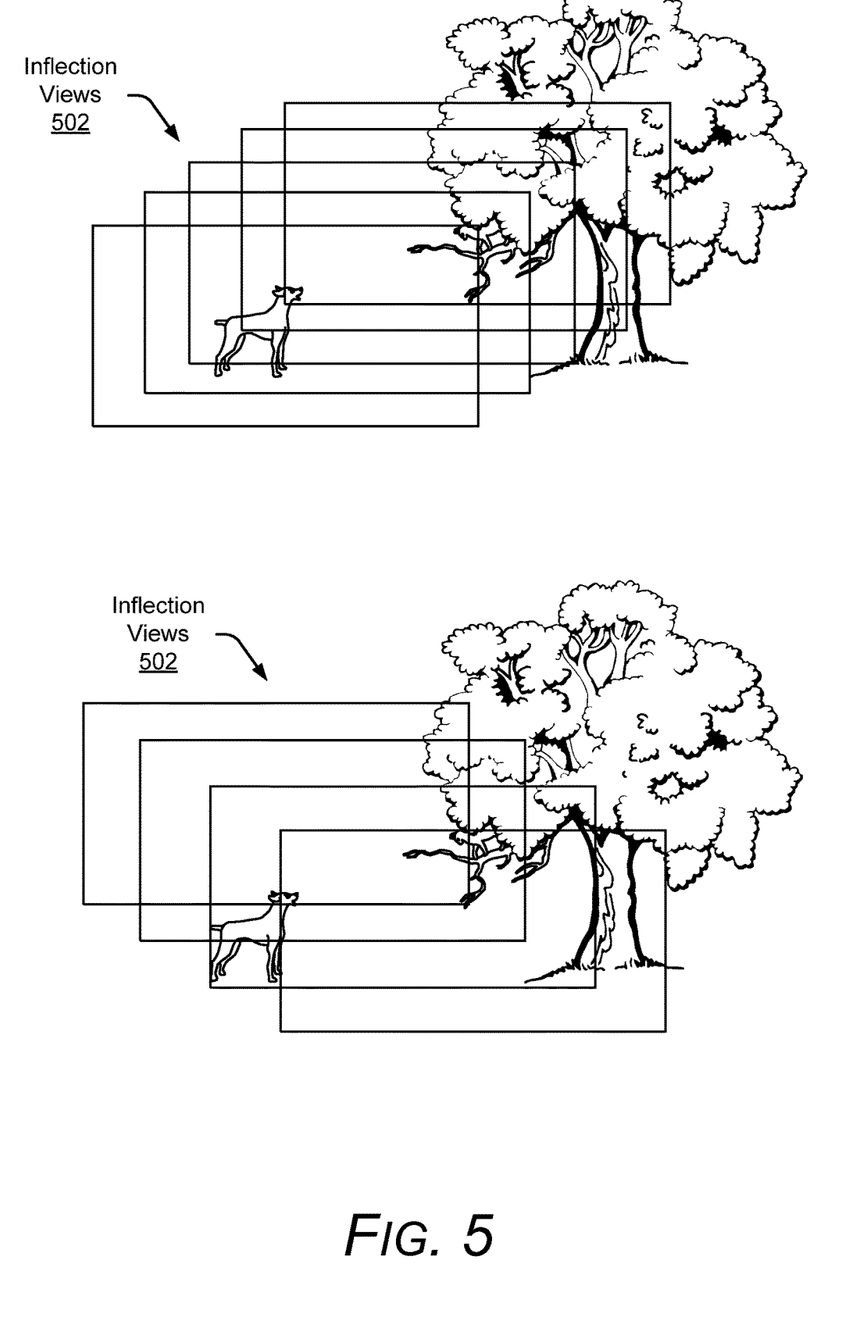
FIG. 5 illustrates possible inflection views for the image of FIG. 4.
Figure 6:
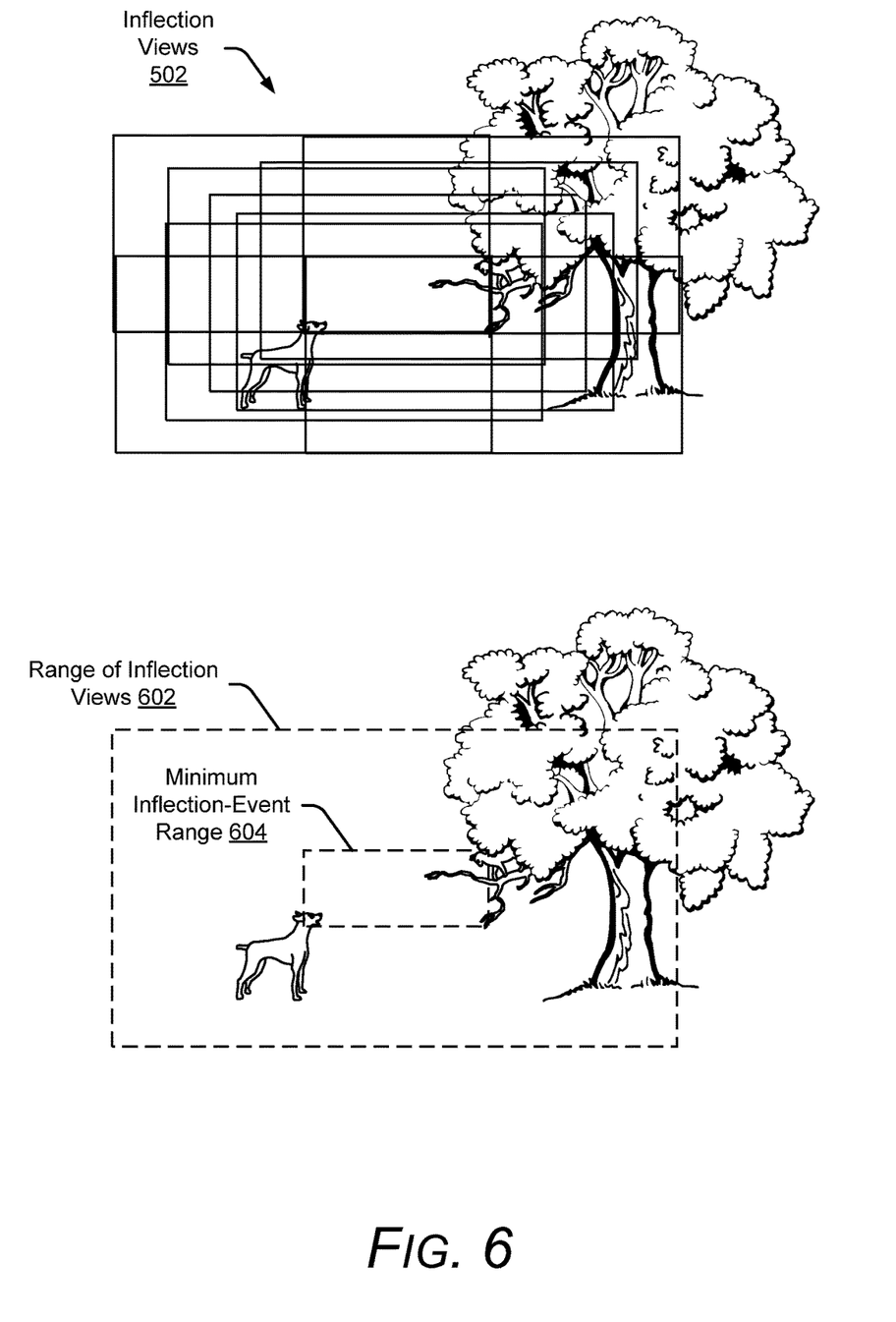
FIG. 6 illustrates a range of possible views that will be considered inflection views and a minimum inflection-event range for inflection views.

FIGS. 5 and 6 illustrate, for image 402 of FIG. 4 (shown in part for brevity), a range of possible views that will be considered an inflection view, with other views being story views for but one of the two stories. For visual simplicity these inflection views are those of a particular display oriented horizontally, though angled, vertical, and so forth could also be shown. These inflection views are shown at 502, each of which shows the eyes of both dog 416 and cat 418 (not marked in FIG. 5).

FIG. 6 illustrates these inflection views 502 overlapping sufficient to show a range of inflection views 602. Thus, views within this range of are considered inflection views. As noted, the author assigned the events of the dog barking at the cat and the cat staring to include the dog's eyes and cat's eyes, which is shown as minimum inflection-event range 604. Thus, views having this minimum inflection-event range 604 are considered inflection views.

Various other manners can be used to assign or determine which views of visual experience 106 are inflection views, story views, and context views, however. Examples include a threshold portion (e.g., 80%) of an ideal inflection view, points for each storyline on an image of the visual experience being within the view (e.g., a point on the dog and a point on the cat), a set of points or subset of the set (e.g., 4 of 5 points assigned to image 402) within the view, and so forth.

Inflection events can be used in various manners by the techniques, as can inflection views showing events from multiple stories. In some cases, however, selection by a user of an inflection view is not required to progress through one or multiple stories. A user may select to view the cat's story from beginning to end without having to view the dog, even at inflection events, while the techniques may still permit the user to progress through the cat's storyline.

Methods

The following discussion describes techniques enabling a multi-story visual experience. These techniques can be implemented utilizing the previously described environment, such as display 104, view-selection mechanism 206, and/or storytelling module 210 of FIGS. 1 and 2. These techniques include example methods illustrated in FIG. 7, which are shown as operations performed by one or more entities. The orders in which operations of these methods are shown and/or described are not intended to be construed as a limitation, and any number or combination of the described method operations can be combined in any order.

Figure 7:
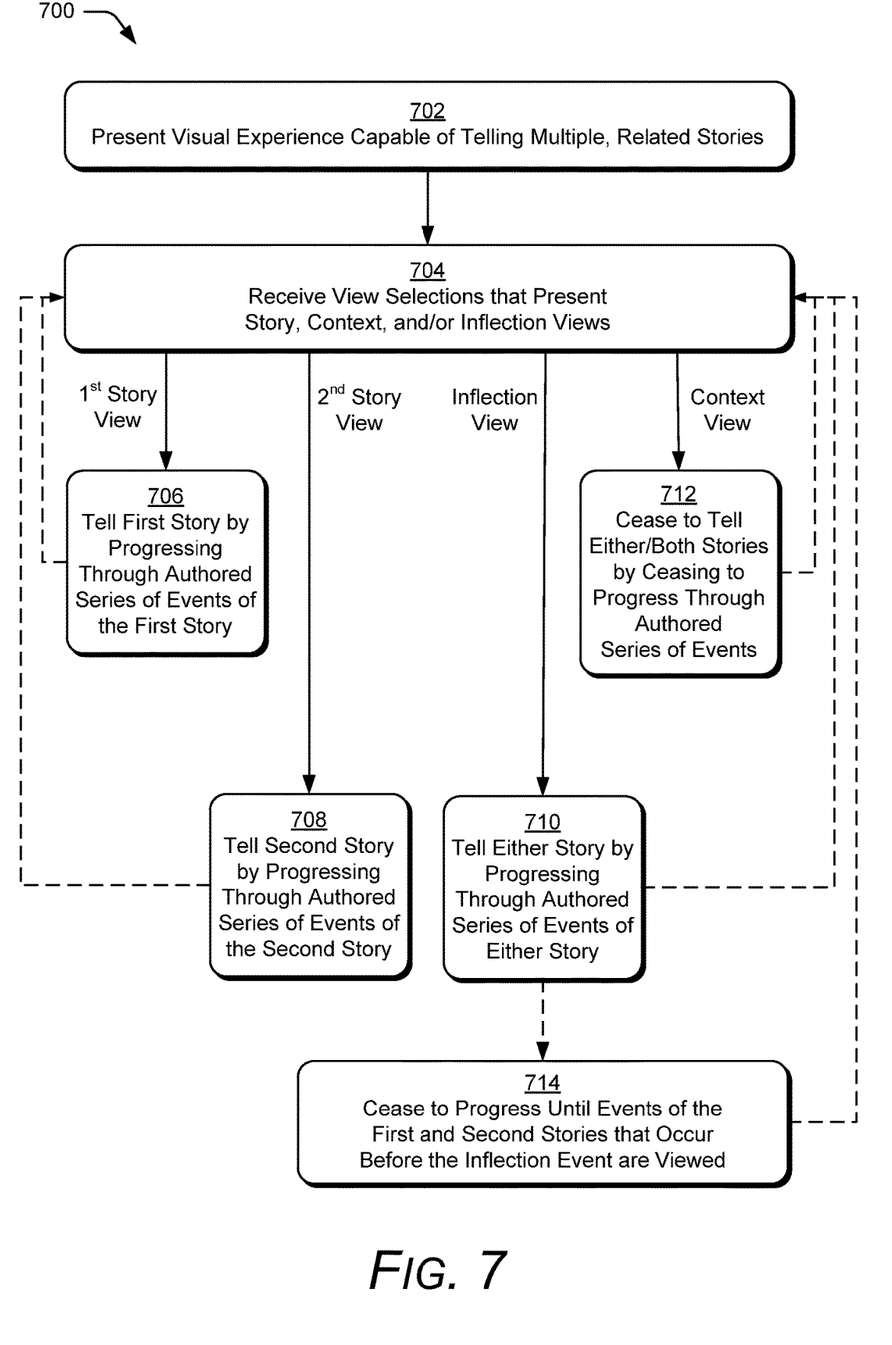
FIG. 7 illustrates example methods enabling multi-story visual experiences.

FIG. 7 illustrates example methods 700 enabling multi-story visual experiences. At 702, a visual experience capable of telling multiple, related stories is presented. As noted in part above, each story is an authored series of events where at least two of the multiple, related stories share at least one inflection event.

The visual experience may show story views, inflection views, and context views. The story views present at least a portion of an event of the authored series of events. The inflection views show related events from at least two stories, which may be visually similar or dissimilar but at least be similar in content. The context views present visual context of the visual experience.

At 704, view selections are received. View selections may include context views, story views of the one or more stories, and/or inflection views.

These view selections can be received from various mobile or non-mobile devices on which the visual experience is presented, such as from a mobile media-consumption device or a television with a set-top box. View selections received may alter or maintain a view into the visual experience, e.g., from a prior view to a current view, effective to switch, in some cases, from one story view (of one story), to a context view, to another story view (of another story), and so forth. Note that view selections, even if maintaining an orientation for the device, may still result in a change between views, as events may move within the visual experience. In the case of a view that maintains a view selection, the methods may determine to not progress a story, such as if the maintaining is longer than a predetermined time period, lasts longer than a current scene, or indicates user inactivity.

When the view selections result in story views of a first of multiple stories, the techniques proceed along a 1$^{st}$ Story View path to operation 706, where the first story is told by progressing through the authored series of events for that first story. Likewise for view selections in story views of a second of the stories, the techniques proceed along a 2$^{nd}$ Story View path to operation 708. For view selections that show an inflection view, the techniques proceed along the Inflection View path to operation 710 to tell either or both stories by progressing through the authored series of events of one or multiples of the stories.

When the view selections result in context views, the techniques proceed along the Context View path to operation 712, where the stories cease to be told by ceasing to progress through the authored series of events of the various stories. Methods 700 may repeat this operation, as shown at dashed lines from operations 706, 708, 710, or 712 to operation 704, as view selections may alternate from story views, context views, inflection views, and so forth until at least one of the stories is fully told.

At 712, when the techniques cease to progress through one of the authored series of events, storytelling module 210 may pause an event (or events if an inflection view) of a last-presented view. Alternately or additionally, storytelling module 210 may cease progress by repeating the event or events (e.g., by restarting the event at a starting point of the event), a set of events of which the event is a part, or a portion of the event. Examples of this repetition are illustrated in FIG. 3 with a looped event 326, a looped set of events 328 (making up all of scene 310), and a looped event portion 330. For example, storytelling module 210 may repeat the last-presented event in part, such as through repeating a seamless portion of an event, like repeating a loop of a half-second clip of the dog staring at the cat (an inflection event). Then, when the user transitions from a context view back to a story view with the dog and/or cat, the story will progress in a visually seamless way. When the user left the dog and cat, the dog was staring at the cat and the cat was arching her back—the same is what the user sees when the user returns to either story.

Figure 8:
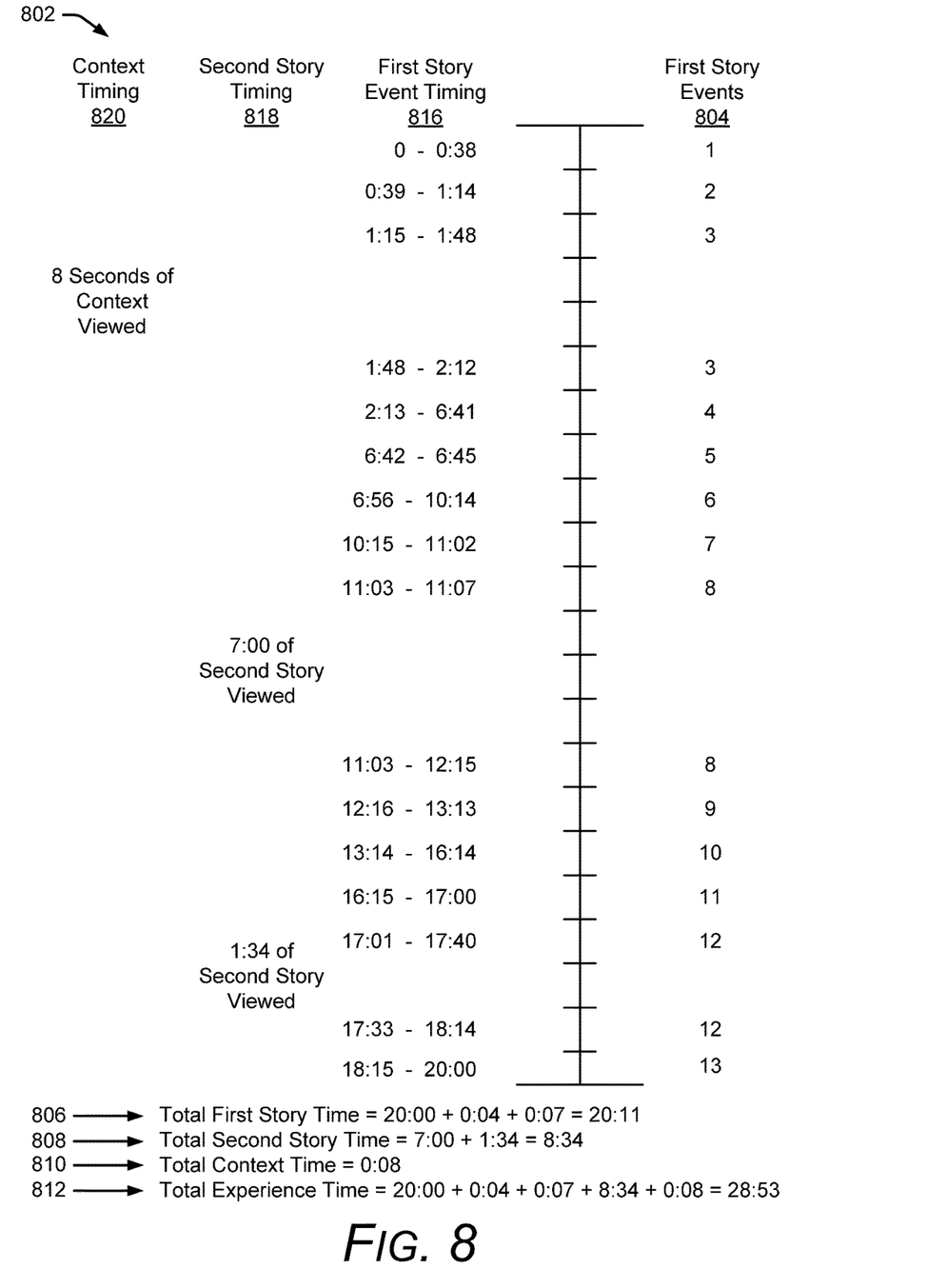
FIG. 8 illustrates a table showing a visual experience's progression through events of a first story, time spent viewing a second story, time spent viewing context, and time spent repeating portions of the first story.

As another example, assume that storytelling module 210 receives view selections effective to orient a display of tablet computer 102-2 of FIG. 2 to select to alter views on the display. Assume also that, for the story about the dog, the view selections select to view context once and the cat's story twice over the progression of the dog's story. This is illustrated in FIG. 8, which includes a table 802 showing a visual experience's progression through events 804 of a first story, time spent viewing a second story, time spent viewing context, and time spent repeating portions of the first story. These are shown calculated at a total first story time 806, which includes total time viewing the first story including repeated portions, a total second story time 808, which includes a total time viewing the second story, a total context time 810, which includes a total time viewing context, and a total experience time 812, which includes a total time viewing the visual experience.

The time spent is broken down in part at first story event timing 816, which shows the time spent viewing the first story along with interruptions when the user viewed context and the second story. The user spent 8:34 viewing the second story (shown at second story timing 818), 0:08 viewing context (shown at context timing 820), for a total of 8:42 viewing both the second story and context, and 20:11 viewing the first story (which can take as little as 20 minutes), for a total experience time 812 of 28:53. The additional 11 seconds to complete the first story is for those events or event portions looped or otherwise repeated, with four seconds repeated from 11:03 to 11:07 and seven seconds looped with event 12 (a portion of event 12 from 17:33 to 17:40 to complete event 12 at 18:14). Each user's time spent to view a story can be different, and each user's views of the stories may also vary, based on each person likely selecting different views, even of a single story.

In this example, the views experienced by the user include images presenting the first story and images presenting the second story and context, with the actual images seen through the user's display depending solely on the user's view selections. This can be represented mathematically as:

$$E(t)=F(Si(Ti),v(t))$$

E(t) is the experienced views as a function (F) of time (t), where Si is the multiple authored events, Ti is the view changes over time, and v(t) other stories and contextual views over time.

Returning to FIG. 7, at 714 methods 700 may optionally cease to progress to, or progress further than, an inflection event until events of both the first and second authored series that occur prior to the inflection event are viewed through view selections. Thus, storytelling module 210 may determine, such as based on information about the visual experience, that the story being viewed should not progress until some portion of the other story is also viewed. Here the techniques cease to progress one story past an inflection event, such as the dog's story past the dog staring at the cat at dog's event 2, until the user has viewed cat's events 1 and 2 (which occur before dog's event 2 and cat's event 3, which are together an inflection event as noted above). The author may consider it important that the user view that the cat chased the mouse prior to proceeding with the dog's story so that the user feels less sympathy for the cat being chased by the dog, for example. Other parts of the cat's story, however, may not be required to continue the remainder of the dog's story. Generally, events of other stories may or may not been required to progress a story currently being viewed.

As noted above, a user may switch between stories. Storytelling module 210 determines how this is done. In some cases, storytelling module 210 simply ceases to tell one story and switched to the other. Storytelling module 210 may, however, require that at least one of the authored series of events of one of the stories be seen from beginning to end. Thus, a user that has viewed the cat's story to event 6, on switching to the dog's story at event 5, may not progress past dog's event 5 or past the next inflection point without going back to dog's event 1. The story may also or instead require the user to return to the cat story prior to completing (or beginning) the next inflection event.

Furthermore, for the overarching story's continuity, here that a dog chases a cat, rather than each story separately, storytelling module 210 may prohibit view selections that move from one storyline to the other storyline except at or near an inflection event. Thus, if viewing the cat, the user may not select to view the dog until the dog is involved in the cat's story—and at that point the user may switch over or go back to a beginning of the dog's story. This selection may involve a particular selection from the user, such as a menu selection to begin the dog's story.

In some other cases, however, a user may jump back and forth, with each switch from one story to another switching to the other story at a last-viewed event. Thus, on receiving a view selection attempting to move from a last-presented of a story's events, storytelling module 210 presents the other story at a last-viewed event or an event immediately following the last-viewed event of the other story. For example, a user may view the cat's story to event 2, then when switching to view the dog's story, storytelling module 210 shows the dog's story from the beginning or whatever event was last seen. With this alternative method, the techniques may require a user to switch prior to a next inflection event, though how many events may be seen prior to the switch may be set by the author or by the user's discretion.

In each of these cases of switching between stories (or between stories and context), the techniques may cease to progress a story being left by: pausing an event of a last-presented view of the story's events; repeating an event of a last-presented view of the story's events; or repeating an event of a last-presented view of the story's events in a loop. In the case of a loop, storytelling module 210 enables a transition between stories and context effective to seamlessly present at least one of the stories.

By way of another example, consider an overarching story, shot as a live-action movie, about a boy and girl growing up, meeting as children, going their own ways, and then years later meeting again, falling in love, and so forth. This is illustrated in FIG. 9 as two storylines 902 and 904 that begin separately, progress separately, intersect at inflection event 906, then progress separately until adulthood as the boy and girl continue to grow up, intersect a second time at inflection event 908 after graduating college, and then progress together at inflection events 910 to an end.

Figure 9:
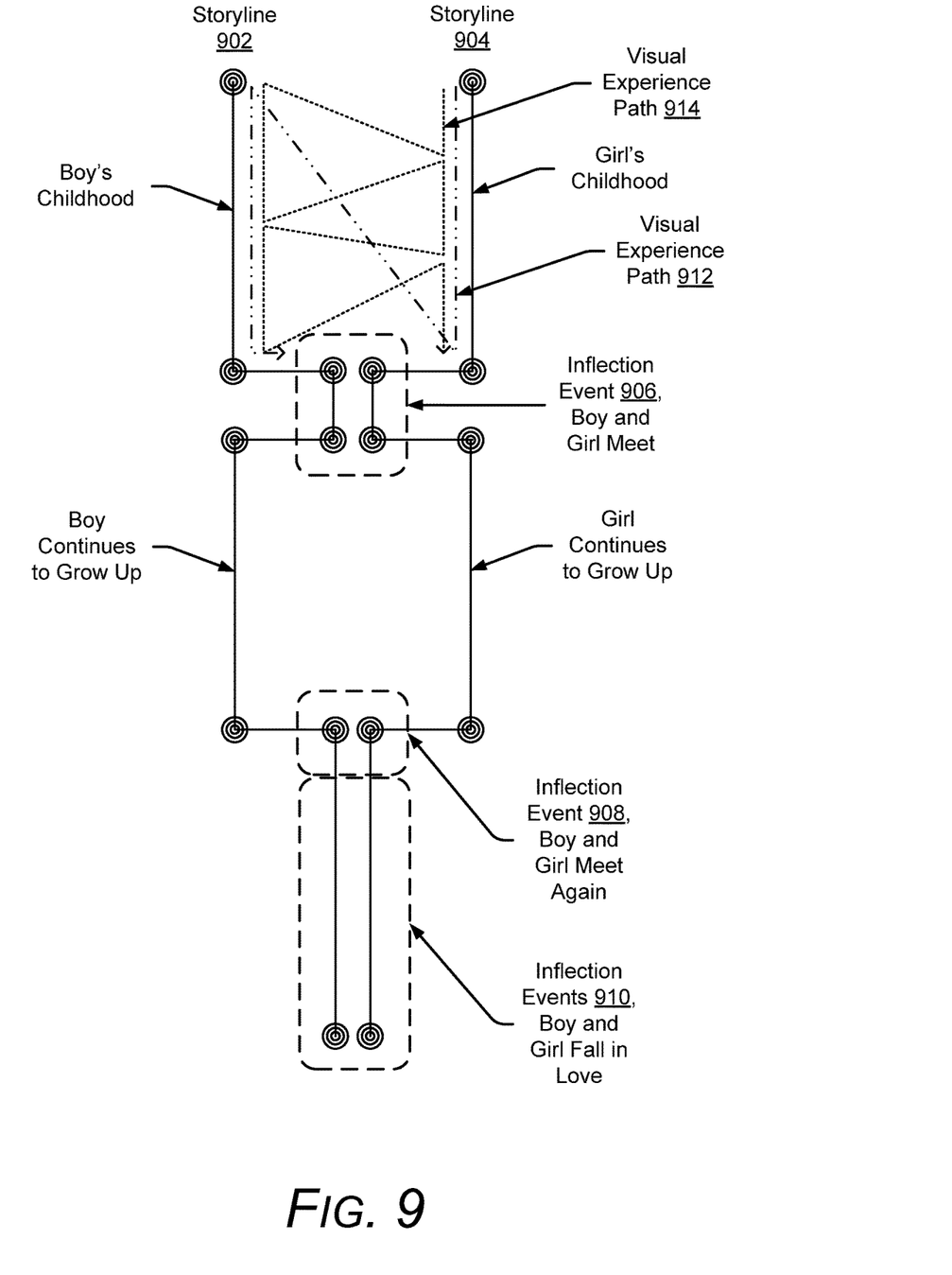
FIG. 9 illustrates two storylines that begin separately, progress separately, intersect at an inflection event, then progress separately until another inflection event, and then progress together to an end.

For this example visual experience having these two storylines of FIG. 9, assume that the user starts at storyline 904 to view the Girl's story. As noted, the techniques may require a user to view both stories before viewing an inflection event, though this is optional. Here assume that the user, in a first case, selects to view all of the Girl's childhood (the Girl's story up to first meeting the Boy) and then selects to view all of the Boy's childhood—this is shown at visual experience path 912. Alternatively, the user may view some of the girl's childhood, then bounce to the boy's childhood, and so on back and forth. This is shown at visual experience path 914. This is but one example, the user may instead view just storyline 902 or 904, and thus the visual experience closely follows one of the storylines. A user may deviate from these storylines through viewing context or subordinate stories, as noted elsewhere herein.

The techniques permit selection of views in various manners, including use of buttons, voice activation, gesture-sensitive displays, and orientation sensors, including receiving and responding in real time. Thus, storytelling module 210 may receive real-time orientation data from orientation sensors of a mobile display on which a user is viewing a visual experience. In real-time and responsive to the real-time orientation data indicating orientations of the mobile display, storytelling module 210 presents views corresponding to the orientations. These views can include an event of one or more stories, context, or subordinate stories as noted above.

While methods 700, table 802 illustrated in FIG. 8, and storylines 902 and 904 of FIG. 9 refer to multiple, related stories and context, the techniques may present subordinate stories in response to selection, as described in part below.

Subordinate Stories

Subordinate stories include one or more subordinate events of an authored series of subordinate events. Subordinate stories are not required for progression of one of the multiple, related stories. Subordinate stories can include unrelated or related stories, such as showing, in FIG. 4, mouse 414 jumping onto flower 412, swinging back and forth, and jumping off again. This is a short subordinate story having few events, but can be fun for users. Some subordinate stories provide additional detail related to, but not essential to, the main story, somewhat akin to a footnote in a non-fiction novel.

For example, a user may select to view only the cat and, in so doing, storytelling module 210 provides a subordinate story showing cat 418 of FIG. 4 sit on the branch, scratch her ears, lick her paws, and tauntingly ignore the dog. While subordinate stories provide character development and perhaps some understanding of why the dog is chasing the cat, or why the boy likes the girl, the author can establish that this character development is not an event of the applicable story, and thus is not needed for that story to progress.

Figure 10:
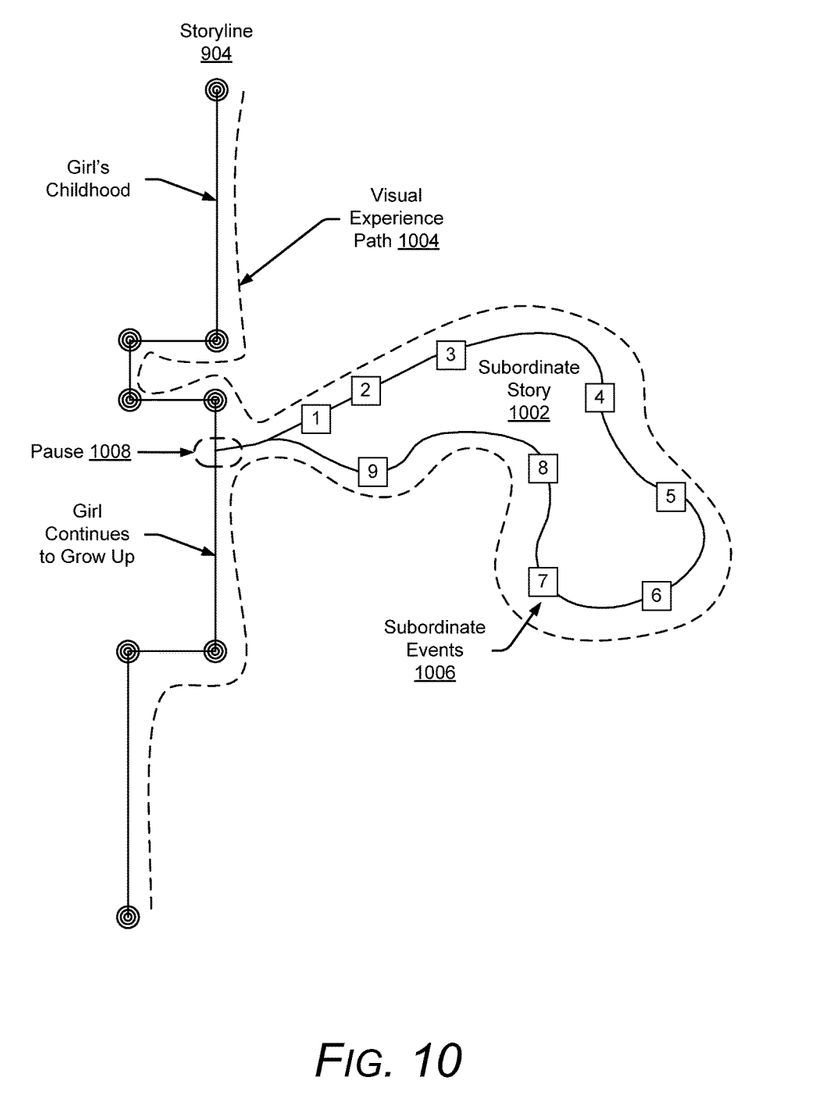
FIG. 10 illustrates a storyline and a subordinate story, both of which are viewed as part of a user-selected visual experience path.

Consider, for example, a user's selection of a subordinate story about the girl's childhood that adds additional background to the girl's story. This is a subordinate story and as such it is not required for progression of the girl's story, though it provides additional details of interest to some viewers. Here the subordinate story concerns the girl's trip to summer camp where she met a different boy. This subordinate story in shown in FIG. 10 at subordinate story 1002, along with storyline 904 of FIG. 9. Assume here that the user, through view selections, selects to view the girl's storyline 904 and subordinate story 1002 and not parts of the boy's storyline 902 of FIG. 9. These selections can be represented visually as visual experience path 1004, showing the user's various selections and subordinate events 1006 one through nine viewed by the user, and a pause to storyline 904 shown at pause 1008.

In some cases, storytelling module 210 may indicate to the user whether or not a current view selected by the user is or is not progressing one of the stories or a subordinate story by presenting a visual indicator in the view. Examples include items that are noticeable but unobtrusive, such as a moth flying near the dog or cat, items of clothing of a same or similar color, even if on different characters, and so forth. More-obvious indicator can also be used, such as reduced resolution when in contextual views, zooming out or zooming in responsive to contextual views, a flashing light, and so forth. When the last event of at least one of the multiple, related stories is presented, storytelling module 210 may end the visual experience.

Example Device

Figure 11:
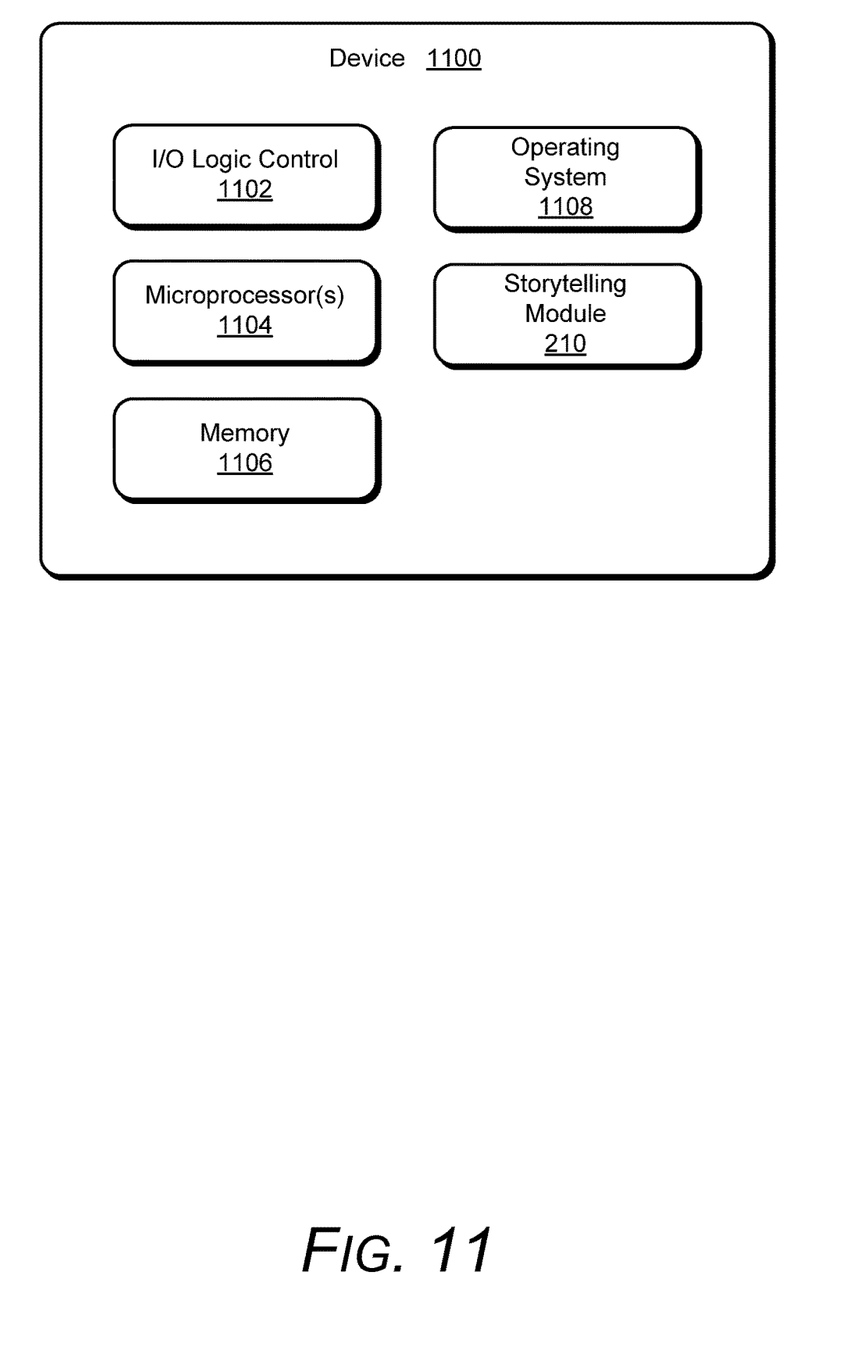
FIG. 11 illustrates a device having various components capable of implementing techniques of multi-story visual experience.

FIG. 11 illustrates various components of an example device 1100 including storytelling module 210 including or having access to other modules, these components implemented in hardware, firmware, and/or software and as described with reference to any of the previous FIGS. 1-10.

Example device 1100 can be implemented in a fixed or mobile device being one or a combination of a media device, computing device (e.g., mobile device 102 of FIG. 1), video processing and/or rendering device, appliance device (e.g., a closed-and-sealed computing resource, such as some digital video recorders or global-positioning-satellite devices), gaming device, electronic device, vehicle, and/or workstation, so long as each is associated with a mobile display.

Example device 1100 can be integrated with electronic circuitry, a microprocessor, memory, input-output (I/O) logic control, communication interfaces and components, other hardware, firmware, and/or software needed to run an entire device. Example device 1100 can also include an integrated data bus (not shown) that couples the various components of the computing device for data communication between the components.

Example device 1100 includes various components such as an input-output (I/O) logic control 1102 (e.g., to include electronic circuitry) and microprocessor(s) 1104 (e.g., microcontroller or digital signal processor, including multiple processors and/or multiple threads). Example device 1100 also includes a memory 1106, which can be any type of random access memory (RAM), a low-latency nonvolatile memory (e.g., flash memory), read only memory (ROM), and/or other suitable electronic data storage.

Example device 1100 can also include various firmware and/or software, such as an operating system 1108, which can be computer-executable instructions maintained by memory 1106 and executed by microprocessor 1104. Example device 1100 can also include other various communication interfaces and components, wireless LAN (WLAN) or wireless PAN (WPAN) components, other hardware, firmware, and/or software.

Other examples capabilities and functions of these components are described with reference to elements shown in FIGS. 1 and 2, along with illustrations of FIGS. 3-10. These components, either independently or in combination with modules or entities described herein, can be implemented as computer-executable instructions maintained by memory 1106 and executed by microprocessor 1104 to implement various embodiments and/or features described herein. These components may also be provided integral with other components of device 1100, such as integrated with storytelling module 210. Alternatively or additionally, any or all of these components can be implemented as hardware, firmware, fixed logic circuitry, or any combination thereof that is implemented in connection with the I/O logic control 1102 and/or other signal processing and control circuits of example device 1100. Furthermore, some of these components may act separate from device 1100, such as a remote (e.g., cloud-based) component performing services for storytelling module 210.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method performed by an apparatus, the method comprising:
    presenting, through a display, a visual experience capable of telling multiple stories, the visual experience in moving visual form and including at least a first story and a second story, the first story being an authored first series of first events and the second story being an authored second series of second events, the authored first series of first events and the authored second series of second events sharing an inflection event connecting plots of the first story and the second story; and
    receiving a view selection and, when the view selection presents an inflection view including the inflection event:
        determining, based on information about the visual experience or prior viewing of the visual experience, that an event of the first series of events of the first story or an event of the second series of events of the second story has not been presented; and
        in response to determining, presenting the determined first event or the determined second event.

2. The method as recited in claim 1, wherein the visual experience includes context views, and responsive to receiving view selections that present the context views, ceasing to progress through the authored first series or the authored second series.

3. The method as recited in claim 1, wherein receiving the view selection includes receiving the view selection from a mobile media-consumption device on which the visual experience is presented and through orientation sensors including a camera or an accelerometer.

4. The method as recited in claim 3, wherein the view selection received from the mobile media-consumption device orients the display on which the visual experience is presented, the orienting effective to select to alter or maintain views on the display.

5. The method as recited in claim 1, wherein the inflection event is visually identical in a first story view and a second story view.

6. The method as recited in claim 1, wherein the inflection event is not visually identical in a first story view and a second story view.

7. The method as recited in claim 1, further comprising receiving another view selection attempting to move from a last-presented view of the authored first or second series and, responsive to the other view selection, presenting another of the authored first or second series at a last-viewed event or at an event immediately following the last-viewed event of the other of the authored first or second series.

8. The method as recited in claim 1, wherein the authored first and second series of events are human-authored and fixed in both order and number.

9. The method as recited in claim 1, wherein the visual experience is annotated sufficient to permit identification of the view selection.

10. An apparatus comprising:
a display;
one or more computer processors; and
one or more computer-readable storage devices comprising processor-executable instructions that, responsive to execution by the one or more computer processors, cause the apparatus to:
present, through the display, a visual experience capable of telling multiple stories, the visual experience in moving visual form and including at least a first story and a second story, the first story being an authored first series of first events and the second story being an authored second series of second events, the authored first series of first events and the authored second series of second events sharing an inflection event connecting the plots of the first story and the second story; and
receive a view selection and, when the view selection presents an inflection view including the inflection event:
determine, based on information about the visual experience or prior viewing of the visual experience, that an event of the first series of events of the first story or an event of the second series of events of the second story has not been presented; and
in response to the determination, present the determined first event or the determined second event.

11. The method as recited in claim 1, wherein presenting the visual experience of moving visual form includes presenting a movie, a television program, or computer-generated animation.

12. The method as recited in claim 1, wherein presenting the determined first event or the determined second event includes presenting an event that occurs prior to the inflection event.

13. The method as recited in claim 1, further comprising returning to the inflection view after presenting the determined first event or the determined second event.

14. The method as recited in claim 1, wherein presenting the first determined event includes presenting a beginning event of the first series of events or presenting the second determined event presents a beginning event of the second series of events.

15. The method as recited in claim 1, wherein determining that the event of the first series or the event of the second series has not been presented is based on a condition assigned by an author of the first series or the second series.

16. The apparatus as recited in claim 10, wherein the visual experience in moving visual form is presented as a movie, a television program, or computer-generated animation.

17. The apparatus as recited in claim 10, wherein the determined first event or the determined second event includes an event that occurs prior to the inflection event.

18. The apparatus as recited in claim 10, wherein the determined first event or the determined second event includes a beginning event of the first series or a beginning event of the second series, respectively.

19. The apparatus as recited in claim 10, wherein the apparatus is further caused to return back and present the inflection view of the inflection event after presenting the determined first event or the determined second event.

20. The apparatus as recited in claim 10, wherein the determination is based, at least in part, on a condition assigned by an author of the first series or the second series.

* * * * *